United States Patent
Annambhotla et al.

(10) Patent No.: US 8,862,765 B2
(45) Date of Patent: Oct. 14, 2014

(54) FAIR BANDWIDTH REDISTRIBUTION ALGORITHM

(75) Inventors: Chandra S. Annambhotla, Beaverton, OR (US); Harindranath Nair, Hillsboro, OR (US); Daniel J. Rice, Portland, OR (US); Robert F. Cruickshank, III, Big Indian, NY (US)

(73) Assignee: ARRIS Solutions, Inc., Suwanee, GA (US)

( * ) Notice: Subject to any disclaimer, the term of this patent is extended or adjusted under 35 U.S.C. 154(b) by 1221 days.

(21) Appl. No.: 12/254,828

(22) Filed: Oct. 20, 2008
(Under 37 CFR 1.47)

(65) Prior Publication Data
US 2009/0265468 A1 Oct. 22, 2009

Related U.S. Application Data

(60) Provisional application No. 60/999,831, filed on Oct. 18, 2007.

(51) Int. Cl.
*G06F 15/16* (2006.01)
*H04L 12/54* (2013.01)
*H04L 12/927* (2013.01)

(52) U.S. Cl.
CPC .......... *H04L 12/5695* (2013.01); *H04L 47/808* (2013.01)
USPC ........................................ 709/232

(58) Field of Classification Search
USPC ....................................... 709/232
See application file for complete search history.

(56) References Cited

U.S. PATENT DOCUMENTS

| | | | |
|---|---|---|---|
| 6,345,038 B1* | 2/2002 | Selinger | 370/230 |
| 7,487,200 B1* | 2/2009 | Srinivasan | 709/201 |
| 7,719,983 B2* | 5/2010 | Pendarakis et al. | 370/235 |
| 2004/0218604 A1* | 11/2004 | Porter | 370/395.2 |
| 2005/0052992 A1* | 3/2005 | Cloonan et al. | 370/229 |
| 2007/0156807 A1* | 7/2007 | Ma et al. | 709/203 |

OTHER PUBLICATIONS

Whirlpool. Know your ISP. http://forums.whirlpool.net.au/forum-replies-archive.cfm/321137.html. pp. 1-21. Jun. 6, 2005.*
NetEqualizer FAQ. http://web.archive.org/web/20070202190443/www.netequalizer.com/ndafaq.htm. pp. 1-7. Feb. 2, 2007.*
Calkins. Power and Sample Size. http://web.archive.org/web/20060519051750/http://www.andrews.edu/~calkins/math/edrm611/edrm11.htm. 2006. pp. 1-4.*
Fabregat, R. Multi-objective optimization scheme for multicast flows: a survey, a model, and a MOEA solution, LANC'05, Oct. 10-12, 2005. pp. 1-14.*
Marbach, "Priority Service and Max-Min Fairness", IEEE/ACM Transactions of Networking, vol. 11, No. 5, Oct. 2003. pp. 733-746.*

* cited by examiner

*Primary Examiner* — John MacIlwinen
(74) *Attorney, Agent, or Firm* — Troy A. Van Aacken

(57) ABSTRACT

A process of managing bandwidth in a computer network having normal users and users that consume a disproportionate amount of bandwidth includes creating bandwidth gates for m users causing disproportionate traffic on the network, each bandwidth gate providing a bandwidth of y, and setting m to a minimum and y to a maximum for the set m.

10 Claims, 2 Drawing Sheets

FAIR BANDWIDTH REDISTRIBUTION ALGORITHM

PRIORITY CLAIM

This application claims priority under 35 USC 119 to USA application No. 60/999,831 filed on Thursday, Oct. 18, 2007.

TECHNICAL FIELD

The present disclosure relates to managing bandwidth in an information distribution network.

BACKGROUND

The emergence of the quadruple play offering, a service bundle that includes data, voice, video and wireless services in the broadband network, along with the emergence of parasitic applications such as Peer to Peer networks (P2P), has contributed to the rapid increase in the traffic levels and network congestion on the cable network.

The majority of the bandwidth on the cable network is often consumed by a very small percentage of users. For example, only 3% of the users may contribute to 47% of the upstream traffic and 58% of all the downstream traffic. These subscribers can cause significant revenue loss as well as deteriorate the network performance for normal users. Providing more bandwidth may solve the problem temporarily, but will increase the infrastructural and operational costs.

Heavy users not only consume a disproportionate amount of bandwidth, they also cause the responsiveness of the network to decrease for the other users. For example, the network's MRT (Mean Response Time), which is analogous to the user's perception of network responsiveness, may increase greatly when the interface utilization of a CMTS interface goes above 60%. Users may observe twice-slower than normal responsiveness at 59% of the interface utilization and ten times slower than normal responsiveness when interface utilization reaches around 71%. The usage band between 59% and 71% is a very sensitive band where the perceived slowness of the network by the user is exponentially increasing. This would make the user feel that the network is congested.

The heavy users that are causing this congestion form a small percentage of the total number of subscribers on the network. When the network is congested, the heavy user's traffic usage needs to be examined, reprioritized and capped in such a way that the other normal users do not perceive the slowness of the network and at the same time heavy users are allowed as much bandwidth as possible without deteriorating the performance of the network for other users.

Even though the percentage of heavy users is small, it is not a constant. Finding out the appropriate number of heavy users to prioritize for capping and redistribution of bandwidth and also how much of their bandwidth should be capped and redistributed are important considerations. It is desirable is to allow fair use of the bandwidth across all users while impacting the least number of heavy users with the smallest amount of bandwidth limitation.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

Figure 1:
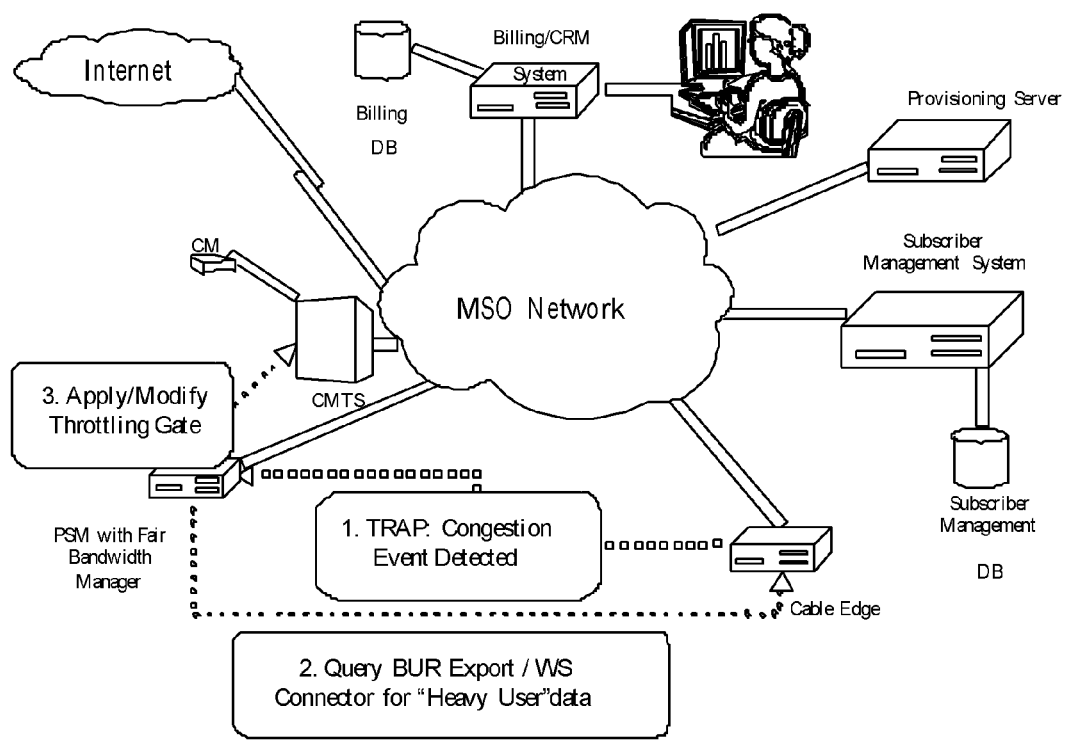
FIG. 1 is a block diagram of an embodiment of a network environment.

FIG. 1 shows a Data Over Cable Service Interface Specification (DOCSIS) network providing network and congestion control and policy management. The network architecture provides an IP-based platform to support a variety of multimedia applications and services requiring network resource conditioning over DOCSIS 1.1 access networks. The network architecture supports a pre-authorized network-based Quality of Service (QOS) delivery model in which 'gates' are created and installed at policy enforcement points, e.g., at a Cable Model Termination System (CMTS) 108, prior to actual network resource reservation or activation requests. This process, termed 'gate control', is managed through a Common Open Policy Service (COPS) based policy interface on the CMTS 108. A gate represents a policy-based authorization for a specific envelope of network resources characterized by a suite of QoS parameters, as well as classifiers for originating and terminating IP addresses and ports, which define and limit the scope of the associated QoS-enhanced flow.

Bandwidth optimization and congestion control solutions are described herein, under the general term Fair Bandwidth Management (FBM). FBM may be applied to pinpoint and prioritize bandwidth of power users on a DOCSIS network 102 and redistribute bandwidth allocation to ensure fair usage of the available bandwidth. FBM may be applied to examine the bandwidth of all the users on the network at the time of congestion and decide the right number of power users to cap and how much to cap based on techniques that optimize the distribution of the available bandwidth to ensure fair usage among all the subscribers. One benefit in certain configurations of the FBM solution is that bandwidth is managed in a targeted manner only when congestion is present with optimally minimum impact to the heavy user's performance. This may be accomplished in an application and user agnostic way to avoid discrimination and privacy concerns. Additional benefits are obtained by policies that except certain users from bandwidth limitations, for example customers who pay additional money for higher tier service, commercial customers, or all VoIP cells which have guaranteed sufficient bandwidth and QoS.

At the onset of network congestion and rapid rises in traffic levels, the following actions may take place in certain embodiments.

An application 104 (e.g. Arris CableEdge™) detects the rise of traffic level and sends a Simple Network Time Protocol (SNMP) trap to an FBM process 106, e.g. logic of a Policy Services Manager (PSM), providing notice of the high rise of the traffic levels and onset of congestion.

The FBM process 106 queries the notifying application 104 for the data utilization rates of cable modems the particular interface where congestion was detected.

The application 104 communicates data usages of the cable modems for a time period, e.g. the past few hours. This reflects the historical data usage of the cable modems. This data may come sorted in a descending order.

The FBM examines current usage, for example in the order that the data is provided. The FSM acts to provide priority to users who have been using a lot of bandwidth over the time period, e.g. the past few hours.

The current usage of the cable modems is examined to identify heavy users on the network.

Gates are applied on heavy users. A gate controls the data usage of the user to which it is applied. The gates may be applied at the CMTS 108.

When gates are applied on the heavy users, the utilization of the CMTS interface 108 decreases, providing improvement in the responsiveness for the normal (non-heavy) users.

The application 104 continues monitoring the interface utilization and detects that utilization of the interface has come down. It communicates an SNMP trap after detecting that the utilization has come down. The time before sending a "congestion down" trap may be configured in such a way that there is no hysteretic effect on the congestion. If the trap is sent too soon, it may so happen that the congestion may return. Thus, the application 104 may be configured to communication an SNMP trap only upon detecting that the interface utilization is consistently down for a number of consecutive samples.

After the application 104 notifies the end of congestion through (for example) an SNMP trap, the FBM deletes the gates previously applied on the heavy users.

A number of heavy users to be capped and bandwidth limits on the gates applied are important parameters for providing a fair share of bandwidth to all users, and at the same time allowing the heavy users as much bandwidth as possible without deteriorating the performance of the network 102.

To ensure reasonable service for the heavy users that are gated, an optimization process may be applied wherein the heavy users are gated only to the extent necessary depending upon various parameters such as their usage in comparison to other heavy or normal users and the desired network utilization level that needs to be maintained so that the Mean Response Time (MRT) of the majority of users does not become too high. In some implementations, so long as the total network utilization is kept well below 59%, the MRT of the users may not vary much or increase to unacceptable levels. Once network utilization exceeds this value, the MRT may grow exponentially and users may experience substantial impact even with a small increase of traffic beyond this point. The optimization technique may take this fact into consideration before arriving at the proper bandwidth value that the heavy users can be allowed. Also, it is non-productive to provide more bandwidth to users who don't use it. This implies that bringing down the total utilization to value much below 59% by restricting the heavy users traffic to a great extent will not improve the MRT of the normal users drastically beyond a certain point. Thus, the amount of bandwidth that the heavy users are provided should be optimized dynamically based on various factors mentioned above.

At the onset of congestion on a specific CMTS interface 108, the utilization of that CMTS interface may reach a threshold limit. The application 104 detects high rise of traffic levels and sends a trap to the FBM process 106. The FBM obtains the details of the individual data utilization of the top users (e.g. from the application 104) and calculates (1) the bandwidth of the gates to be created, and (2) the number of users for whom the gates need to be created. A way of finding optimal values for these parameters will be described.

Let $$du_1+du_2+du_3+du_4+du_5+\ldots du_n=C*\beta \qquad (1)$$

where $du_n$ represents the data utilization rate of user n on the cable network. The data utilization rates may be sorted in a descending order where $du_{n-1}>du_n$. When the percentage utilization of the CMTS interface 108 reaches a peak level above threshold C, the application 104 sends a trap. The symbol $\beta$ represents the available bandwidth of the CMTS upstream interface and n is the total number of subscribers on the interface.

Once a trap is received, the FBM logic 106 may apply gates on the heavy users who are consuming most of the bandwidth. Let the number of users for whom the gates are created be m and let the bandwidth available on each of the gates be y. One goal may be to minimize m to the least number of customers who are going to be impacted by gates. Another goal may be to set a high gate bandwidth y so that the impact to the m customers is as small as possible, while at the same time providing fair access to the total bandwidth resource available, $\beta$, for all n customers on the congested interface. Because m is a subset of n, it's always true that m<=n.

To reduce the utilization on the CMTS interface 108 to a configured uncongested level, gates are applied on the heavy users such that the total utilization of the heavy as well as the normal users comes to a level well below the threshold level C. Let UC be the uncongested percentage utilization of the CMTS interface 108 after the gates are applied. Then:

$$my+du_{m+1}+du_{m+2}+\ldots du_n=UC*\beta \qquad (2)$$

An un-serviced demand may exist that allows some lesser consumers of data ranked at $>du_{m+1}$ consume more bandwidth than they would have prior to the gates being set. This may be controlled by proper selection of the values C and UC. Solving equations (2) and (1) for my gives $$du_1+du_2+du_3+\ldots du_m-my=(C-UC)*\beta \qquad (3)$$

Rearranging (3) yields:

$$my = \sum_{i=1}^{m} du_i - (C-UC)*\beta \qquad (4)$$

Equation (4) shows that the bandwidth reduction (C−UC) is taken from the m heavy users. The value of UC is a system constant and C is the current utilization that is known from the trap, so the product my may be determined. The best values of this product of m and y are those that do not affect many non-heavy users and also do not completely cut off bandwidth to the top m users. The value m should be minimized. The value y may be maximized so that the top m users traffic is not blocked more than necessary. In some embodiments C or UC may be parameterized thresholds (vs. constants) based on measures such as, for example, the number of voice calls present on the interface.

In equation (4), the lowest value of y occurs when my=0.

$$\text{When } my = 0, \sum_{i=1}^{m} du_i = (C - UC) * \beta$$

Let the value of m at this point be $m_{low}$. The value of y may not reach zero because $d_u$ values are discrete. The point where summation of $d_u$ crosses (C−UC) percent of the bandwidth gives the lowest non-negative value for y which is represented as $y_{low}$.

Let $m_{high}$ and $y_{high}$ be the high limits of m and y. There exists a value $m_{high}$ such that $y_{mHigh} \geq du_{mHigh}+1$. In other words, if m increases beyond a certain point, it will end up boosting some user's bandwidth. When the value of y reaches a point where its value becomes higher than the next data utilization sample, the values of m and y at this point will be the high limits on these variables.

Upon defining the higher and lower limits, a set of solutions becomes possible which address the problem. The challenge is to find the best possible solution of m and accordingly y where m is contained by $\{m_{low} \ldots m_{high}\}$. Two approaches for finding the optimal solution are described below.

From Equation (4), y may be expressed as $$y = \sum_{i=1}^{m} du_i - (C - UC) * \beta / m$$

$$\text{When } \sum_{i=1}^{m} du_i < (C - UC) * \beta, \, y < 0$$

$$\text{When } \sum_{i=1}^{m} du_i > (C - UC) * \beta, \, y > 0$$

When the summation of the data utilization of the top users is less than the desired reduction in the interface utilization which is (C−UC)*β, y is negative. The value of y either becomes zero or crosses zero when the summation equals or just crosses the desired reduction of bandwidth utilization. After this point, y takes on positive values and keeps increasing until m reaches a point $m_{High}$ after which y starts going down. It can be shown that y reaches a peak at $m_{high}$. When y reaches a peak, the following inequality holds:

$$y_{m+1} \leq y_m \tag{5}$$

Expanding y, (5) becomes $$\sum_{i=1}^{m+1} du_i - (C - UC) * \beta / (m+1) \leq \sum_{i=1}^{m} du_i - (C - UC) * \beta / m \tag{6}$$

$$m\left[\sum_{i=1}^{m+1} du_i - (C - UC) * \beta\right] \leq (m+1)\sum_{i=1}^{m} du_i - (m+1)[(C - UC) * \beta]$$

$$m * du_{m+1} + m * \sum_{i=1}^{m} du_i - m * (C - UC) * \beta - m * \sum_{i=1}^{m} du_i -$$

$$\sum_{i=1}^{m} du_i + m * (C - UC) * \beta + (C - UC) * \beta \leq 0$$

$$m * du_{m+1} - m * \sum_{i=1}^{m} du_i + (C - UC) * \beta \leq 0$$

$$du_{m+1} \leq m * \sum_{i=1}^{m} du_i - (C - UC) * \beta / m$$

$$du_{m+1} \leq y_m$$

Equation (5) leads to equation (6). This is the high limit on y. Thus, y assumes a peak value at $m_{high}$. It may be shown in a similar manner, that if $y_{m+1} \geq y_m$, then $du_m + 1 \geq y_m$ which only occurs before $m_{High}$ occurs. Thus, y begins with negative values, crosses zero and keeps increasing until its values becomes greater than the data utilization of the next sample, at which point it starts and continues to decrease. The value of y reaches a peak very quickly because the number of heavy users are much smaller than the total number of users. The point at which y reaches a peak (i.e. $m_{High}$) is the optimum point to choose.

If the traffic distribution is not exponential and if network bandwidth is being shared by a larger percentage of users more equally, y may not reach a peak for very small m. Also, in some cases m may not be that high, and it may be desirable to find optimum values for m and y well before the $m_{high}$ point. In such cases, a weighted sum technique for multi-objective optimization may be employed. As m increases, y also increases until m reaches $m_{high}$. The optimum point would be one where the percentage of increase of y is much higher than the percentage of increase of m after m exceeds $m_{low}$. Two bi-objective optimizations may be chosen as follows.

$$\text{Max} J1(m) = y = \sum_{i=1}^{m} du_i - (C - UC) * \beta / m$$

$$\text{Min} J2(m) = m$$

In the classical weighted sum method technique of multi-objective optimization, many objective functions are expressed as a single objective function and that function is either minimized or maximized as per the requirement. Thus, we may express the single optimization function as follows:

$$F(m) = w1 * J1(m) + w2 * J2(m) \tag{7}$$

where w1 and w2 are weights or importance assigned to each of the functions. The function J2(m) should be minimized and J1(m) should be maximized:

$$F(m) = w1 * J1(m) - w2 * J2(m) \tag{8}$$

Any increase in one of the functions may be reduced/canceled by the increase in the other function, thereby not substantially contributing to the net optimality of the final function. The function F(m) should be maximized in this case. But y and m have different units and different magnitudes. We use their normalized values in the following way:

$$F(m)=w1*J1(m_i)-J1(m_{low})/J1(m_{high})-J1(m_{low})- \\ w2*J2(m_i)-J2(m_{low})/J2(m_{high})-J2(m_{low}) \quad (9)$$

Figure 2:
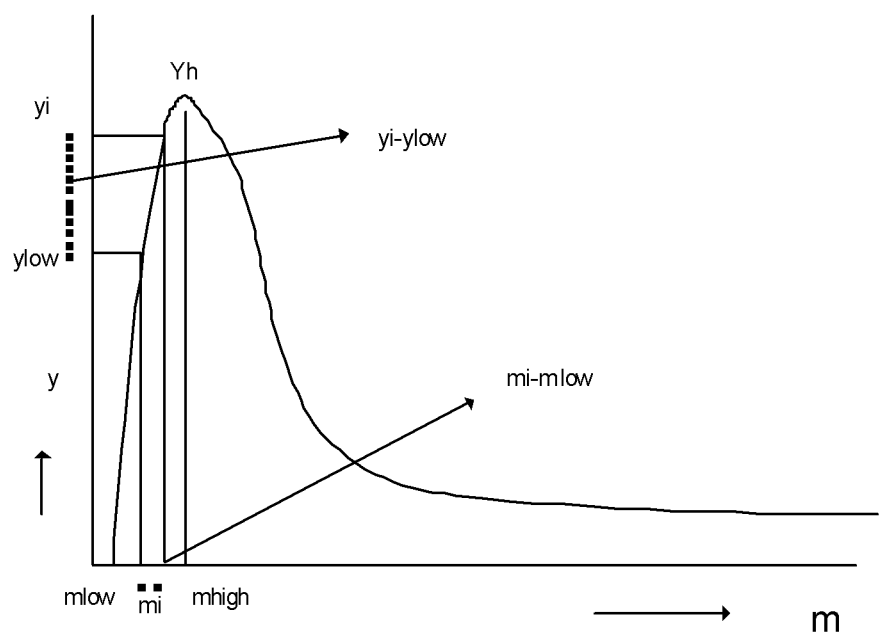
FIG. 2 is an illustration of a bandwidth demand curve.

Assigning equal weight to both the functions, (9) may be written as $$F(m)=[yi-y_{low}/(y_{high}-y_{low})]-[mi-m_{low}/(m_{high}-m_{low})]$$

where $y_{low} \leq y_i \leq y_{high}$ and $m_{low} \leq m_i \leq m_{high}$ and F(m) may vary from −1 to 1. FIG. 2 shows this optimization process graphically.

In FIG. 2 $y_{high}-y_{low}$ is the maximum amount of bandwidth that may be obtained by including $(m_{high}-m_{low})$ users. The values $y_i-y_{low}/(y_{high}-y_{low})$ and $m_i-m_{low}/(m_{high}-m_{low})$ give the percentage change that is achieved on the Y-axis and X-axis at the point $(m_i, y_i)$. For example, if at value $m_i=20$, $y_i-y_{low}/(y_{high}-y_{low})=0.8$, and $m_i-m_{low}/(m_{high}-m_{low})=0.2$, the F(x) will be 0.6. At another point, $m_i=15$ and $y_i-y_{low}/(y_{high}-y_{low})=0.6$ and $m_i-m_{low}/(m_{high}-m_{low})=0.15$. Here the fitness function is 0.45. Thus adding 5% more users gives a 20% increase in y. The point at which the fitness function becomes maximum is the global Pareto optimal point.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A process of managing bandwidth in a computer network, comprising:
   setting a utilization threshold C at a network interface;
   when utilization of the network interface reaches or exceeds the threshold C, setting a bandwidth limit y to be applied a number of network users m;

determining a reduced utilization C-UC where UC is a bandwidth utilization less than C;

for the reduced utilization C-UC, determining a value m*y that minimizes m and maximizes a bandwidth available to the network users m under the bandwidth limit y;

lowering the amount of total bandwidth consumed by applying the bandwidth limit y to the m network users.

2. The process of claim 1, further comprising:

one or both of C and UC are system constants.

3. The process of claim 1, further comprising:

one or both of C and UC are determined based a number of voice calls on the network interface.

4. The process of claim 1, further comprising:

if traffic distribution on the network is not exponential, and if network bandwidth is being shared by a first percentage of users on an equal basis, applying a weighted sum technique for multi-objective optimization to determine values of m and y.

5. The process of claim 4, further comprising:

determining the values of m and y by determining where a percentage of increase in y is higher by a factor than a percentage of increase of m, after m exceeds a first low threshold value.

6. A cable modem termination system (CMTS), comprising:

non-transitory machine readable media and/or machine memory embodying logic to manage bandwidth in a computer network, by influencing a behavior of the CMTS to apply a bandwidth limit y to a number of network users m when utilization of a network interface of the CMTS reaches or exceeds a threshold C, thus enforcing a reduced utilization C-UC where UC is a bandwidth utilization less than C; and to determine a value m*y that minimizes m and maximizes a bandwidth available to the network users m under the bandwidth limit y for C-UC;

lowering the amount of total bandwidth consumed by applying the bandwidth limit y to the m network users.

7. The CMTS of claim 6, further comprising:

non-transitory machine readable media and/or machine memory embodying constant values for one or both of C and UC.

8. The CMTS of claim 6, further comprising:

non-transitory machine readable media and/or machine memory embodying logic to determine one or both of C and UC based a number of voice calls on the network interface.

9. The CMTS of claim 6, further comprising:

non-transitory machine readable media and/or machine memory embodying logic to (a) determine if traffic distribution on the network is not exponential, and (b) to determine if network bandwidth is being shared by a first percentage of users on an equal basis, and if (a) and (b) are true, to apply a weighted sum technique for multi-objective optimization to determine values of m and y.

10. The CMTS of claim 6, further comprising: non-transitory machine readable media and/or machine memory embodying logic to determine where a percentage of increase in y is higher by a factor than a percentage of increase of m, after m exceeds a first low threshold value.

* * * * *